United States Patent [19]
Culberson et al.

[11] Patent Number: 6,142,786
[45] Date of Patent: Nov. 7, 2000

[54] EDUCATING SPECIAL NEEDS CHILDREN ABOUT SHAPES AND HARDWARE

[75] Inventors: Judith L. Culberson; Dean A. Caldwell, both of Winston-Salem; Christie Lockhart, Fayetteville, all of N.C.

[73] Assignee: Kaplan Companies, Inc., Lewisville, N.C.

[21] Appl. No.: 09/266,276

[22] Filed: Mar. 11, 1999

[51] Int. Cl.⁷ .................................................. A63B 69/18
[52] U.S. Cl. .................... 434/258; 434/247; 434/260; 434/365; 273/440; 446/85
[58] Field of Search ..................... 434/382, 256, 434/258, 259, 260, 247; 206/223, 580, 579; 220/692, 693; 446/144, 86, 227; 273/440

[56] References Cited

U.S. PATENT DOCUMENTS

| | | | |
|---|---|---|---|
| 1,848,598 | 3/1932 | Barnes | 434/259 |
| 3,674,264 | 7/1972 | Boercker | 273/1 R |
| 3,690,017 | 9/1972 | Holmquist | 35/24 R |
| 4,168,583 | 9/1979 | Halpern | 35/31 D |
| 4,262,431 | 4/1981 | Darnell | 434/170 |
| 4,457,722 | 7/1984 | Housand | 434/260 |
| 4,604,062 | 8/1986 | Woods | 434/88 |
| 4,775,321 | 10/1988 | Comeaux et al. | 434/110 |
| 5,066,234 | 11/1991 | LeDesma | 434/205 |
| 5,282,740 | 2/1994 | Okayasu | 431/344 |
| 5,435,728 | 7/1995 | Fula et al. | 434/258 |
| 5,538,432 | 7/1996 | Dondero et al. | 434/258 |
| 5,799,942 | 9/1998 | Birt | 273/256 |

OTHER PUBLICATIONS

The Child Guidance Toys (Toddler). Cleo Learning Aids. p. 175, 1976.

Delta Education catalog, p. 7; Spring 1999.

*Primary Examiner*—Sam Rimell
*Assistant Examiner*—Bena B. Miller
*Attorney, Agent, or Firm*—Charles W. Calkins; Kilpatrick Stockton LLP

[57] ABSTRACT

An apparatus to educate a special needs child about shapes and hardware includes a working platform having three boards that each have one of three faces. A first face has colored areas with shaped openings in the colored areas, including round openings, square openings and triangular openings in respective ones of the colored areas. A second face has threaded openings, including openings equipped with bolts and openings to receive screws, and also including openings to receive pegs. A third face has an assortment of locks. The apparatus includes collections of pegs, threaded shafts, nuts, elastic bands and an internal box with internal compartments. The collections of items can be placed in the compartments or on the faces, as appropriate to assist a special needs child in learning skills needed in life.

30 Claims, 5 Drawing Sheets

EDUCATING SPECIAL NEEDS CHILDREN ABOUT SHAPES AND HARDWARE

BACKGROUND OF THE INVENTION

The present invention relates to methods and apparatus for teaching special needs children about shapes and common elements of hardware. It provides a product designed for two primary categories of children with special needs. The first category is Educable Mentally Handicapped (EMH) children, who are able to be taught in a classroom setting and have the potential to progress into a vocational-tech career path. The second category is Trainable Mentally Handicapped (TMH) children, who have the abilities to understand and use what they have learned, but on a limited basis. Both groups of children, if properly taught, have the possibility of moving into Independent Living Environments.

Until recently, the needs of such children have not been adequately addressed. One particularly critical, unaddressed skill for independent living is the ability to recognize and use money.

The product may also benefit individuals with motor or cognitive difficulties that are not necessarily categorized as mentally handicapped. For instance, the items could be used by adults who need special assistance with fine motor skills, including individuals who suffer from strokes or other impairments that require some type of therapeutic intervention.

An effective training system teaches an important and useful skill that is fun for the student. The system should be designed to the level of the learning ability of the student because one that is too complicated will frustrate and cause confusion. This is especially important when training persons with learning disabilities and also those having short attention spans who may become easily frustrated. Many of the currently available training systems for teaching students about shapes and hardware are geared to skill levels above persons in these groups.

Existing training tools are often complicated. Even after a student has been instructed on how to perform the lesson, he or she may still be apprehensive and uncertain when required to perform the lesson independently. These types of training systems are often not enjoyed by the students, resulting in their reluctance or refusal to use them.

Therefore, there is a need for a system of training students how to recognize shapes and develop rudimentary skills with common hardware objects that uses intuitive and relaxed methods that students can understand and use independently after a minimal amount of instruction.

SUMMARY OF THE INVENTION

The present invention fulfills this need in the art by providing an apparatus to educate a special needs child about shapes and hardware including a working platform having three faces, a first face having colored areas with shaped openings in the colored areas, a second face having threaded openings, and a third face having an assortment of locks. Also included are a collection of pegs shaped and sized to be received in the shaped openings and a collection of threaded shafts shaped to be received in the threaded openings. This permits a child to learn to associate shapes by matching pegs to shaped openings, to associate threaded fasteners by matching threaded shafts to threaded openings and to learn to recognize and operate locks.

The platform preferably includes three boards that each have one of the three faces, with the boards hinged together to form a three-fold unit that can be folded flat for storage or opened to have a triangular cross section. In a preferred embodiment, the boards are hinged together with piano hinges. One of the boards may have an inner groove, so that a free end of another board can fit into the inner groove to make the three boards assume a triangular configuration.

The shaped openings in the first face may include round openings, square openings and triangular openings. The round openings, square openings and triangular openings may be each located in the first face in respective ones of the colored areas. Desirably, the collection of pegs have colors that match the color of the area in which its corresponding opening is located.

The threaded openings in the second face may include openings equipped with bolts, and the apparatus may include a collection of nuts to permit a child to thread nuts on to bolts to learn to associate nuts and bolts.

The threaded openings in the second face may include openings matched to receive screws, and the collection of threaded shafts may include screws to permit a child to thread screws into the second face to learn to insert screws into a surface.

Preferably, the second face also includes openings to receive pegs, and the apparatus includes a collection of elastic bands to permit a child to insert pegs into openings and stretch elastic bands between inserted pegs.

In a preferred embodiment the third face has a deadbolt, a keylock, a chain lock and a door with a hook and eye lock. The inclusion of the hinged door closed by a hook and eye lock is particularly preferred. Such a hinged door may cover a celebratory logo, which becomes visible to the child when he or she is successful in unhooking the hook and eye and opening the door, providing positive reinforcement of success.

The apparatus may also include a closeable box having internal compartments for separately holding the collections of pegs and collection of threaded shafts. Preferably, the internal compartments are colored, and the pegs are colored to indicate to the child the appropriate compartment to store the pegs so that the peg and compartment colors match.

The apparatus may also include a carton for containing the working platform, collection of pegs, and collection of threaded shafts. In such a case, inclusion of a closeable box having internal compartments for separately holding the collections of pegs and collection of threaded shafts is preferred, with the carton sized to contain the working platform in a folded condition and the closeable box with the collection of pegs, and collection of threaded shafts within. The carton preferably has a closeable and lockable lid.

The invention also provides a method of educating a special needs child about shapes and hardware including assembling a working platform to potentially show the child three faces, a first face having colored areas with shaped openings in the colored areas, a second face having threaded openings, and a third face having an assortment of locks. The method includes providing the child a collection of pegs shaped and sized to be received in the shaped openings and encouraging the child to place the pegs into corresponding openings in the first face. The method also includes providing the child a collection of threaded shafts shaped to be received in the threaded openings and encouraging the child to place the threaded shafts into corresponding openings in the first face. And the method includes encouraging the child to manipulate the locks on the third face to open and close the locks. These activities permit a child to learn to associate shapes by matching pegs to shaped openings, to associate threaded fasteners by matching threaded shafts to threaded openings and to learn to recognize and operate locks.

Assembly of the platform may include unfolding three boards that each have one of the three faces to form a triangular cross section. It may also include inserting a free end of one of the boards into an inner groove of another board to make the three boards assume a triangular configuration.

Encouraging the child to place the pegs into corresponding openings in the first face may include encouraging the child to insert round pegs into round openings, insert square pegs into square openings and insert triangular pegs into triangular openings. The encouragement preferably includes pointing out that the openings to receive the pegs are each located in the first face in respective ones of the colored areas so that the colored areas and pegs have matching colors.

The method may also include inserting threaded bolts into the threaded openings in the second face and encouraging the child to thread nuts on to the bolts to learn to associate nuts and bolts.

Encouraging may include encouraging the child to thread screws into the second face to learn to insert screws into a surface.

Encouraging includes encouraging the child to insert pegs into openings in the second face and to stretch elastic bands between inserted pegs.

Encouraging the child to manipulate the locks on the third face may include encouragement for a deadbolt, a keylock, a chain lock and a door with a hook and eye lock.

Encouraging the child to manipulate the locks on the third face may include encouragement open a hook and eye that close a hinged door and encouragement to open the hinged door. Preferably, this method includes exposing a celebratory logo when the child is successful in unhooking the hook and eye and opening the door.

The method may also include encouraging the child to store the pegs in a closeable box having colored internal compartments for separately holding the collections of colored pegs and collection of threaded shafts so that the pegs and compartment colors match.

The method may also include encouraging the child to pack the working platform, collection of pegs, and collection of threaded shafts into a carton.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
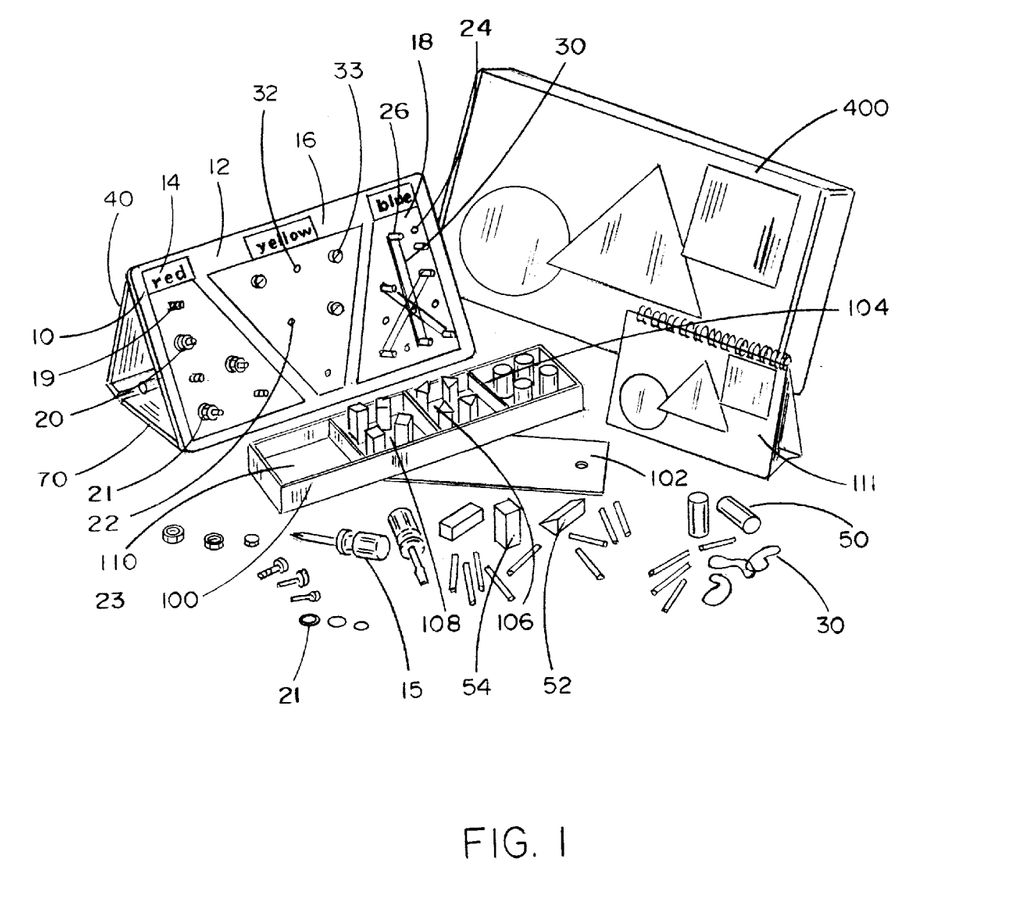
FIG. 1 is a perspective view of a kit of components making up a preferred embodiment of the present invention.

FIG. 1 depicts various components which are preferably used in connection with the present invention. A carton 400 holds the other contents, as will be discussed in further detail hereinafter.

A platform member 10 is made up of three panels 12, 40, and 70, which are predominantly characterized by their outer faces. The outer face of panel 12 is colored as red section 14, yellow section 16, and blue section 18. Within each colored section are a series of holes.

Holes 20 are located in red section 14, holes 22 are located in yellow section 16, and holes 24 are located in the blue section 18. The holes 20 in the red section are sized to receive bolts 19 and perhaps washers 21 and nuts 23. Various sizes of the bolt, washer and nut combinations can be used in the red area 14. The holes 22 in the yellow section 16 are provided with internal threadings 32 so that they can receive screws 33.

The holes 24 in the blue section 18 are provided as a straight-through bore so that they can receive smooth dowels or pegs 26 as a friction fit. A plurality of elastic bands such as rubber bands 30 are provided to be strung between the installed pegs 26.

FIG. 1 also shows a closeable box 100 having a lid 102 to cause the closure. The box 100 is divided into four compartments including red compartment 104, yellow compartment 106, and two blue compartments 108 and 110. Also depicted in FIG. 1 is a collection of round, red pegs 50, triangular, yellow pegs 52, and square, blue pegs 54. An activity guide 111 is also preferably included so that the student and teacher can each be viewing instructions for the various steps to be undertaken in connection with the use of the apparatus. The activity guide 111 is openable into an A-frame shape. One A-frame side visible to the student has student-appropriate instructions and graphics on it. The other A-frame side has instructions and graphics for the teacher, which can be more sophisticated and detailed than the student's instructions and graphics.

Figure 2:
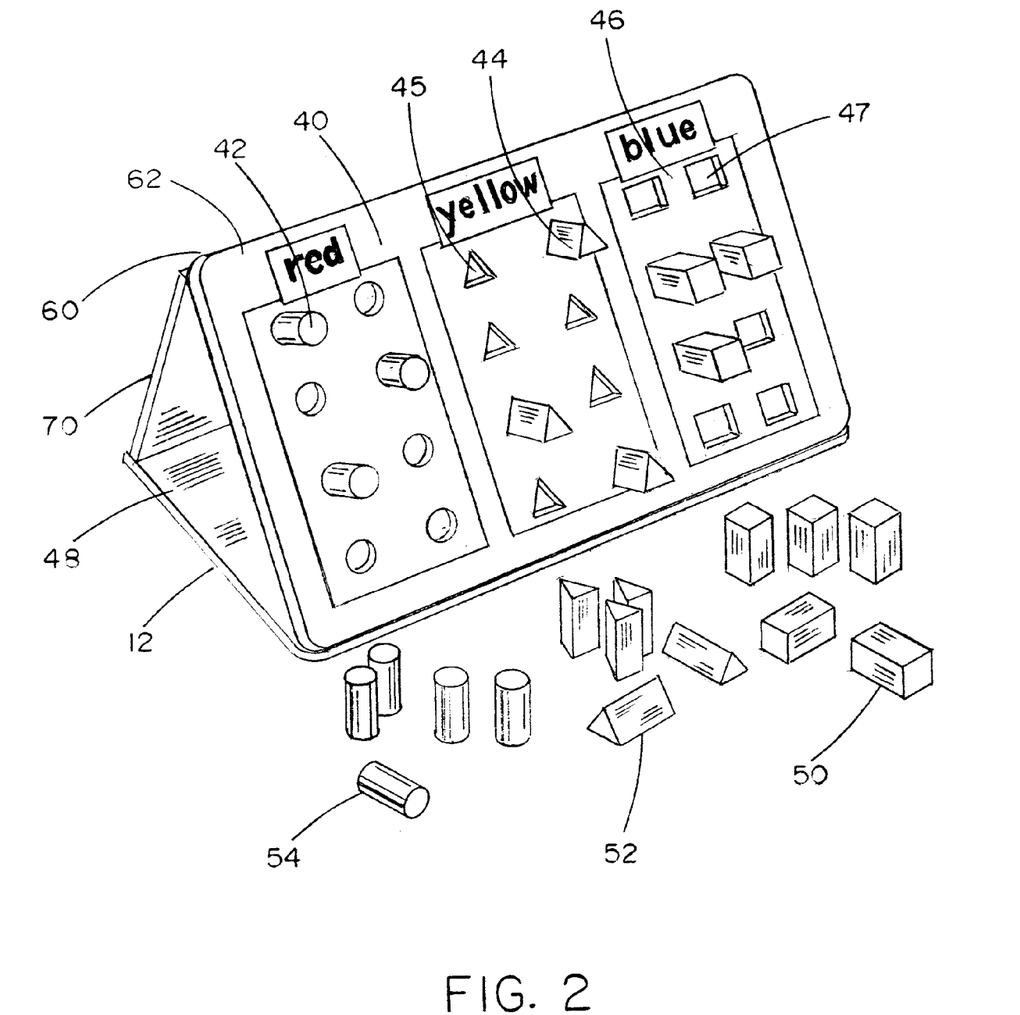
FIG. 2 is a perspective view of the preferred embodiment of the present invention, in particular showing the platform member from a different view than in FIG. 1.

The panel 40 can be seen in FIG. 2 with a red section 42 with circular holes 48. Similarly, a yellow section 44 has triangular holes 45, and a blue section 46 has square holes 47. The sizes of the various holes 48, 45 and 47 are slightly larger than the outer perimeter of the pegs 50, 52 and 54 so that the pegs 50, 52 and 54 can be inserted into the respectively shaped holes. The pegs 50 are blue colored, the same as the blue section 46, which surrounds the square holes 47. The triangular pegs 52 are yellow colored so that they match the yellow color of area 44 which surrounds the yellow holes 45. The pegs 54 are red colored, the same as the area 42 which surrounds the circular holes 48. The matching of color and shape provides two cues to assist the child in locating the proper position for insertion of a peg into a hole. Preferably, the holes do not extend all the way through the panel 40, so an underlying floor supports the inserted pegs.

Figure 3:
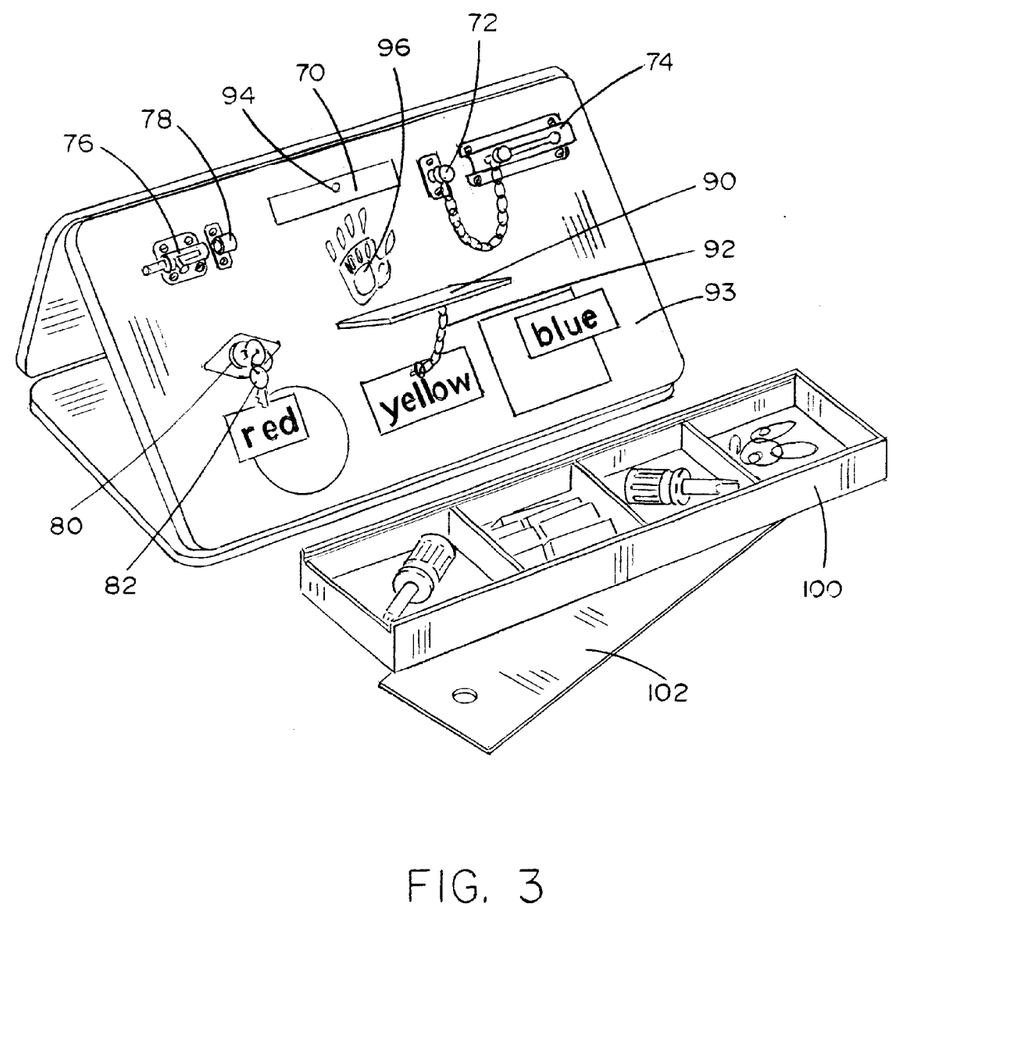
FIG. 3 is a perspective view of the preferred embodiment of the present invention, in particular showing the platform member and closeable box from a different view than in FIGS. 1 and 2.

FIG. 3 depicts the third panel 70, which is provided with a plurality of locks to enable a child to learn how to operate a lock. A first lock is a chain lock composed of the chain mount 72 and the slide receiver 74 for the chain attached to the mount. Also included are a deadbolt 76 and receiver 78 for the deadbolt. The panel 70 also has a keylock 80 and key 82 so that the child can learn about the insertion of keys into keylocks, and the rotation and opening of the lock.

The panel 70 is also provided with a hinged door 90 that covers a celebratory logo 96, when engaged against the panel 70. The hinged door is provided with a hook 92 that engages an eyelet 94 mounted on the panel 70. The hook and eye closure on the hinged door 90 secures the door 90 against the panel 70, covering the logo 96. This arrangement provides the child an opportunity to unhook the hook 92 from the eyelet 94 and subsequently actually open a door and reveal the celebratory logo 96, which indicates to the child his or her success.

Figure 4:
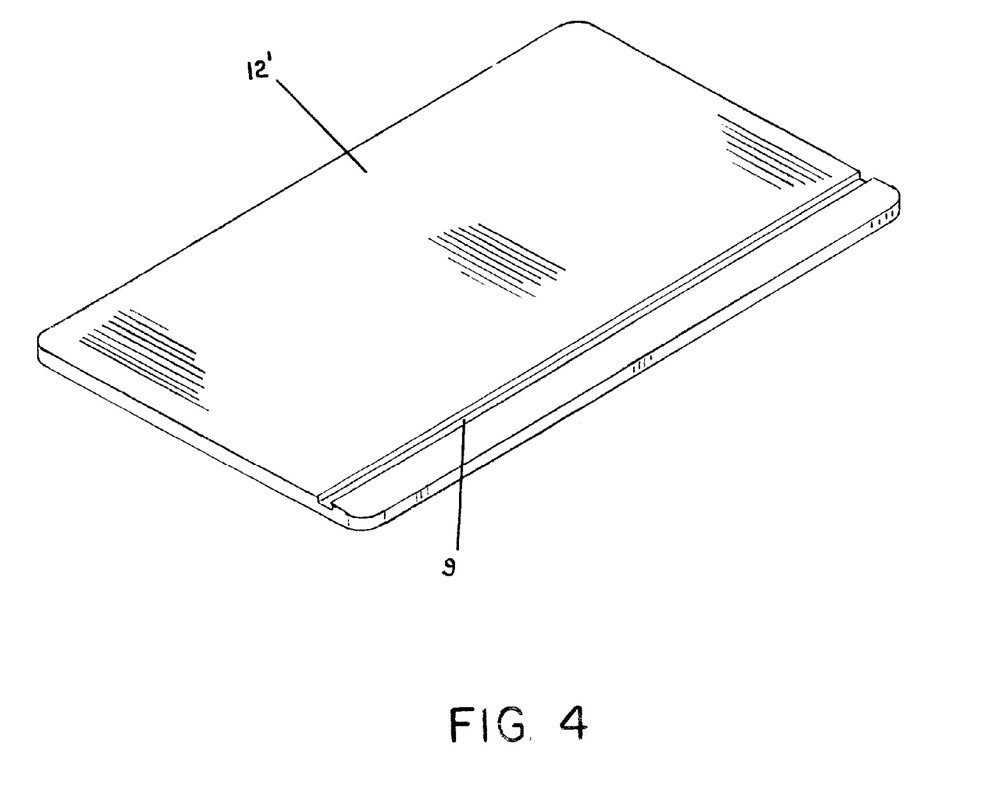
FIG. 4 is a view of the back of one of the panels of the platform member of the preferred embodiment.

As seen in FIG. 2, the panel 70 has a thickened ridge 60 to which is connected the panel 40 by a full-length extending piano hinge 62. A similar piano hinge connects panel 70 and panel 12. Thus, the panel 12 can be folded back-to-back to the panel 70 and then overlaid by the panel 40 to make a compact configuration. The opened, three-sided platform 10 is supported by engagement of the lower edge of the panel 40 with a groove 9 on the backside of 12' of the panel 12 as seen in FIG. 4. Thus, when the three sides are opened to the triangular configuration, the engagement provides a secure triangular construction.

When the three panels are folded together, the door 90 faces an outward side of the panel 70 and creates a thickened area on the folded assembly. The portion 93 below the door 90 is sized to be slightly larger than the width of the box 100, so that the box 100 can rest against the portion 93 of the panel 70 to make a nested configuration for installation in the carton 400. As can be appreciated, the nesting also prevents the box 100 from sliding around extensively within the carton 400.

In operation, a child is likely to first use the apparatus in connection with the panel 40 together with the closeable box 100. The pegs 50, 52 and 54 will be stored in their respectively colored compartments in the box 100 and placed within reach of the child along with the panel 40. Instructions on the guide 111 encourage the child to retrieve pegs from the box 100 and place them on the panel 40, being aided by the similarities of color and shape.

In addition, the child is encouraged each step of the way by graphics on the pages exposed in the guide 111. The guide 111 is formed in an A-frame configuration so that the child sees exemplary information, with the rear provided with more detailed and sophisticated information to aid the teacher in encouraging the child to undertake the steps depicted on the page exposed to the child.

After concluding activities with the panel 40, the guide 111 encourages the child to move on to the activities with panel 12. At this point, the teacher is encouraged by appropriate pages within the guide 111 to mount bolts rearwardly through the holes 20 in the red section and perhaps to affix certain nuts 23 to hold the bolts in place. Alternatively, the bolts can be permanently mounted within the hole 20 threadings by embedded nuts 23 so that the threaded shaft of the bolt is presented to the child facing the panel 12. The child can then be provided with the nuts and washers to be mounted on the exposed bolt shanks. The child obtains experience and familiarity with the varying sizes of washers and nuts, and their appropriateness for use on various size bolts.

The child is also provided with a plurality of screws 33 which can be screwed into the holes 32 in the yellow area 16. In this regard, the assembly of components includes a screwdriver 15 which can be used by a relatively nimble special needs child to manipulate the screws 33 for insertion into the holes 32. The guide 111 has appropriate graphics and instructions to encourage this step.

The child is also provided with a plurality of pegs 24 to arrange in any desired order over the holes 26 in the blue region. Also, pegs may be provided for the holes in the yellow and red regions, if desired. The child thus learns insertion of pegs in holes and can then make visually pleasing patterns by stretching the elastic bands 30 between the inserted pegs. The guide 111 provides easy to follow prompts for the child along with more sophisticated prompts for the teacher, when taking advantage of the A-frame configuration of the guide 111. The guide 111 may also include instructions and encouragement for removal and return of the nuts, washers, screws, pegs and bands to one or more compartments in the box 100.

Upon completion of activities with the panel 12, the child may be encouraged to work with the various locks depicted on panel 70 seen in FIG. 3, using guidance and encouragement in the guide 111. He or she can be given encouragement to practice engaging and disengaging the chain 72 from its slot 70, opening and closing the deadbolt 76 into its receiver 78, inserting and turning the key 82 in the keylock 80, and the like.

It is particularly desirable to save operations with the door 90 as a final operation on the panel 70. The child can be encouraged through instructions in the guide 111 to manipulate the hook 92 to remove it from the eyelet 94 and, thus, free door 90 to be pivoted downwardly to the configuration shown in FIG. 3. This being done, the celebratory logo 96 is seen, and the child is thereby given positive reinforcement for his or her successes.

Figure 5:
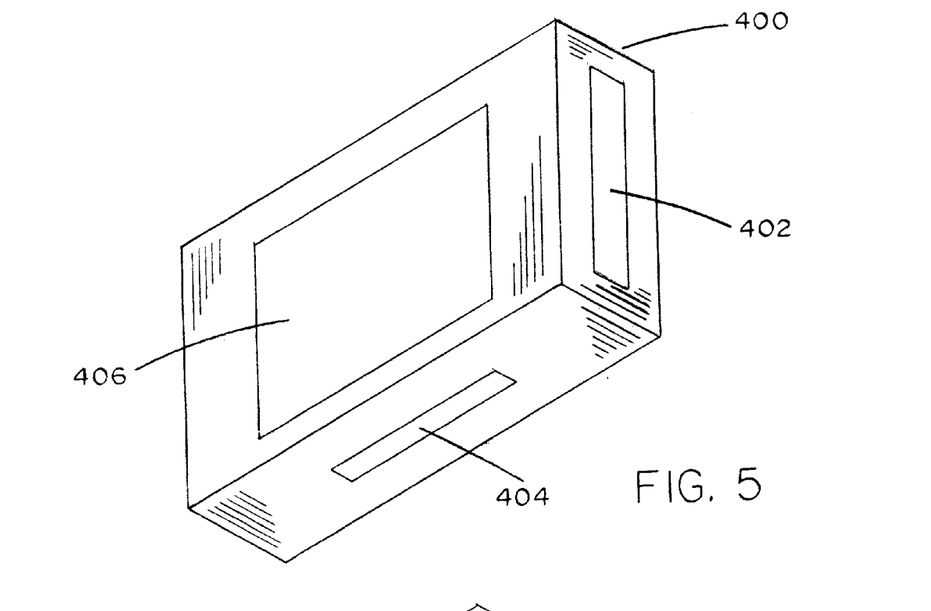
FIG. 5 is a top perspective view of a carton useful in an embodiment of the invention.

FIG. 5 depicts a carton 400 for holding the collapsed platform 10 and closed box 100 so that they may be stored in a classroom for ready accessibility to the teacher. The carton 400 can be provided with a label 406 indicative of the contents of the carton and a side label 402. The carton is preferably a corrugated cardboard, but other materials can be used. The top label 406 can be adhered to a hinged lid, which can be closed and secured by an interlocking handle 404 in a locked position.

Figure 6:
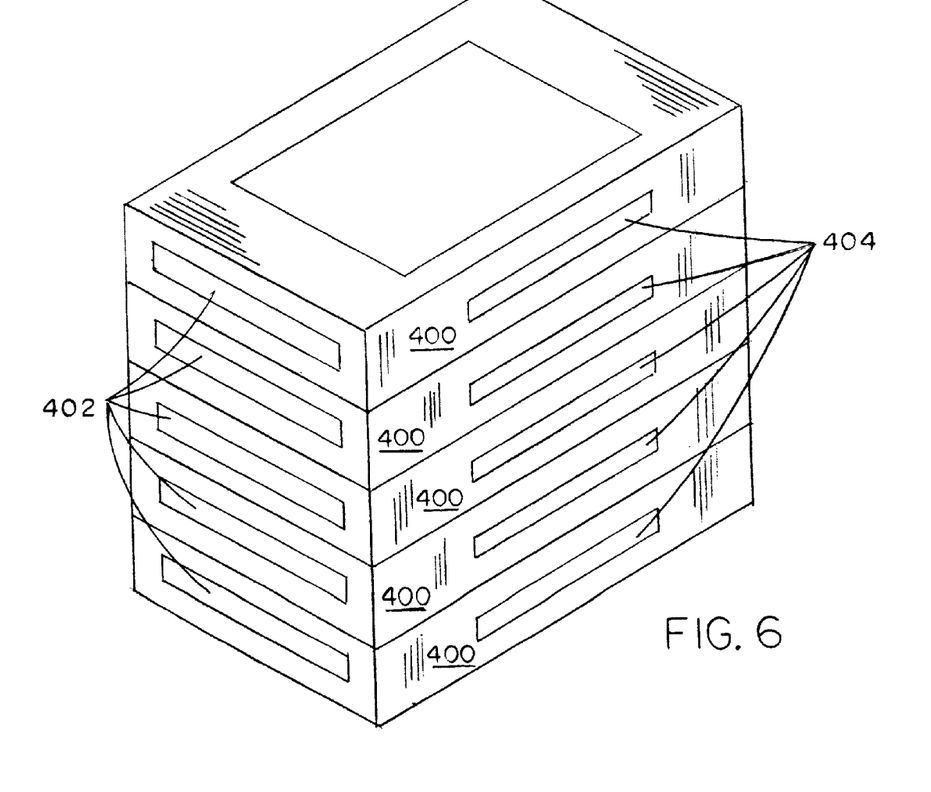
FIG. 6 is a top perspective view of stack of cartons like the one depicted in FIG. 5 useful in an embodiment of the invention.

Given that special needs children will have a number of different life skills to learn, they will all preferably be available in a classroom or other educational setting, and can be retrieved for use on a selected basis. Thus, a stack of the cartons 400 as seen in FIG. 6 can be provided such that their individual labels 402 are visible, and the appropriate carton holding manipulatives contents can be retrieved by the teacher for use as needed.

In addition, the carton 400 may be used by the child to take the apparatus home for further exercises or to demonstrate his or her success to his or her family.

By use of this apparatus, children learn to use tools safely and to assemble basic kit constructions. In addition, they develop fine motor, cognitive and self-help skills. The color and shape codes teach children to place pegs in a board, tighten nuts, bolts, screws, and to use rubber bands. The child also learns to use a variety of household locks.

It should be understood that all such modifications and improvements have been deleted herein for the sake of conciseness and readability but are properly within the scope of the following claims.

We claim:

1. An apparatus to educate a special needs child about shapes and hardware comprising:
   a working platform having three faces, a first face having colored areas with shaped openings in the colored areas, a second face having threaded openings, and a third face having an assortment of locks,
   a collection of pegs shaped and sized to be received in the shaped openings, and a collection of threaded shafts shaped to be received in the threaded openings, whereby a child can learn to associate shapes by matching pegs to shaped openings, to associate threaded fasteners by matching threaded shafts to threaded openings and to learn to recognize and operate locks;

wherein said platform includes three boards each having one of said three faces, said boards being hinged together to form a three-fold unit that can be folded flat for storage or opened to have a triangular cross section.

2. An apparatus as claimed in claim 1 wherein said boards are hinged together with piano hinges.

3. An apparatus as claimed in claim 1 wherein one of said boards has an inner groove, so that a free edge of another board can fit into the inner groove to make the three boards assume a triangular configuration.

4. An apparatus as claimed in claim 1 wherein said shaped openings in said first face include round openings, square openings and triangular openings.

5. An apparatus as claimed in claim 4 wherein said round openings, square openings and triangular openings are each located in said first face in respective ones of said colored areas.

6. An apparatus as claimed in claim 5 wherein said collection of pegs shaped and sized to be received in the shaped openings have colors that match the color of the area in which its corresponding opening is located.

7. An apparatus as claimed in claim 1 wherein said threaded openings in said second face include openings adapted to be equipped with bolts and the apparatus includes a collection of nuts to permit a child to thread nuts on to bolts to learn to associate nuts and bolts.

8. An apparatus as claimed in claim 1 wherein said threaded openings in said second face include openings matched to receive screws, and the collection of threaded shafts includes screws to permit a child to thread screws into the second face to learn to insert screws into a surface.

9. An apparatus as claimed in claim 1 wherein said second face also includes openings to receive pegs, and the apparatus includes a collection of elastic bands to permit a child to insert the pegs into the openings and stretch the elastic bands between inserted pegs.

10. An apparatus as claimed in claim 1 wherein said third face has a deadbolt, a keylock, a chain lock and a door with a hook and eye lock.

11. An apparatus as claimed in claim 1 wherein said third face has hinged door closed by a hook and eye lock.

12. An apparatus as claimed in claim 11 wherein said hinged door covers a celebratory logo, which becomes visible to the child when he or she is successful in unhooking said hook and eye and opening said door.

13. An apparatus as claimed in claim 1 further comprising a closeable box having internal compartments for separately holding said collections of pegs and collection of threaded shafts.

14. An apparatus as claimed in claim 13 wherein said internal compartments are colored and said pegs are colored to indicate to the child the compartment to store the pegs so that the peg and compartment colors match.

15. The apparatus of claim 1 further comprising a carton for containing the working platform, collection of pegs, and collection of threaded shafts.

16. An apparatus as claimed in claim 15 further comprising a closeable box having internal compartments for separately holding said collections of pegs and collection of threaded shafts, said carton sized to contain said working platform in a folded condition and said closeable box with said collection of pegs, and collection of threaded shafts therein, said carton having a closeable and lockable lid.

17. An apparatus to educate a special needs child about shapes and hardware comprising:

a) a working platform having three boards that each have a unique face, said boards being hinged together with piano hinges to form a three-fold unit, one of said boards having an inner groove, so that a free end of another board can fit into the inner groove to make the three boards assume a triangular configuration that can be folded flat for storage or opened to have a triangular cross section, said three faces including:

i) a first face having colored areas with shaped openings in the colored areas, said shaped openings in said first face including round openings, square openings and triangular openings located in said first face in respective ones of said colored areas, ii) a second face having threaded openings, including openings equipped with bolts and openings to receive screws, and also including openings to receive pegs, and iii) a third face having an assortment of locks, including a deadbolt, a keylock, a chain lock and a hinged door closed by a hook and eye lock, said hinged door covering a celebratory logo, which becomes visible to the child when he or she is successful in unhooking said hook and eye and opening said door, b) a first collection of pegs, each peg shaped and sized to be received in a shaped opening and having color that matches the color of the area in which its corresponding opening is located, c) a collection of threaded shafts shaped to be received in the threaded openings including screws to permit a child to thread screws into the second face to learn to insert screws into a surface, and d) a collection of nuts to permit a child to thread nuts on to bolts to learn to associate nuts and bolts, e) a second collection of pegs and a collection of elastic bands to permit a child to insert pegs from said second collection into openings in said second face and stretch elastic bands between inserted pegs of said second collection f) a closeable box having internal compartments for separately holding said collections of pegs, nuts, elastic bands and threaded shafts, said internal compartments being colored to indicate to the child the compartment to store the pegs so that the peg and compartment colors match, g) a carton sized to contain said working platform in a folded condition and said closeable box with the collection of pegs, and collection of threaded shafts therein, said carton having a closeable and lockable lid, whereby a child can learn to associate shapes by matching pegs to shaped openings, to associate threaded fasteners by matching threaded shafts to threaded openings and to learn to recognize and operate locks.

18. A method of educating a special needs child about shapes and hardware comprising:

assembling a working platform to sequentially show the child three faces, a first face having colored areas with shaped openings in the colored areas, a second face having threaded openings, and a third face having an assortment of locks, providing the child a collection of colored pegs shaped and sized to be received in the shaped openings and encouraging the child to place the pegs into corresponding openings in the first face;

providing the child a collection of threaded fasteners having threaded shafts shaped to be received in the threaded openings and encouraging the child to place the threaded shafts into corresponding openings in the second face; and encouraging the child to manipulate the locks on the third face to open and close the locks;

whereby a child learns to associate shapes by matching pegs to shaped openings, to associate threaded fasteners by matching threaded shafts to threaded openings, and to learn to recognize and operate locks and wherein assembling the platform includes unfolding three boards each having one of the three faces to form a triangular cross section.

19. A method as claimed in claim 18 wherein assembling the platform includes inserting a free end of one of the boards into an inner groove of another board to make the three boards assume a triangular configuration.

20. A method as claimed in claim 18 wherein encouraging the child to place the pegs into corresponding openings in the first face includes encouraging the child to insert round pegs into round openings, insert square pegs into square openings and insert triangular pegs into triangular openings.

21. A method as claimed in claim 20 wherein the encouragement includes pointing out that the openings to receive the pegs are each located in the first face in respective ones of the colored areas so that the colored areas and pegs have matching colors.

22. A method as claimed in claim 18 further comprising inserting threaded bolts into the threaded openings in the second face and encouraging includes encouraging the child to thread nuts on to the bolts to learn to associate nuts and bolts.

23. A method as claimed in claim 18 wherein encouraging includes encouraging the child to thread screws into the second face to learn to insert screws into a surface.

24. A method as claimed in claim 18 wherein encouraging includes encouraging the child to insert pegs into openings in the second face and to stretch elastic bands between inserted pegs.

25. A method as claimed in claim 18 wherein encouraging the child to manipulate the locks on the third face includes encouragement for a deadbolt, a keylock, a chain lock and a door with a hook and eye lock.

26. A method as claimed in claim 18 wherein encouraging the child to manipulate the locks on the third face includes encouragement open a hook and eye that close a hinged door and encouragement to open the hinged door.

27. A method as claimed in claim 26 further comprising exposing a celebratory logo when the child is successful in unhooking the hook and eye and opening the door.

28. A method as claimed in claim 18 further comprising encouraging the child to store the pegs in a closeable box having colored internal compartments for separately holding the collections of colored pegs and collection of threaded shafts so that the pegs and compartment colors match.

29. The method of claim 18 further comprising encouraging the child to pack the working platform, collection of colored pegs, and collection of threaded shafts into a box.

30. A method of educating a special needs child about shapes and hardware comprising:

assembling a working platform to sequentially show the child three faces, a first face having colored areas with openings shaped as round openings, triangular openings and square openings in the colored areas, a second face having threaded openings, and a third face having an assortment of locks, including unfolding three boards each having one of the three faces to form a triangular cross section and inserting a free end of one of the boards into an inner groove of another board to make the three boards assume a triangular configuration, providing the child a collection of colored pegs shaped and sized to be received in the shaped openings and encouraging the child to place the pegs into corresponding openings in the first face, including encouraging the child to insert round pegs into round openings, square pegs into square openings and triangular pegs into triangular openings, and including pointing out that the openings to receive the pegs are each located in respective ones of the colored areas so that the colored areas and pegs have matching colors, providing the child with a collection of threaded bolts and encouraging the child to insert the threaded bolts into the threaded openings in the second face, providing the child a collection of threaded nuts and encouraging the child to thread nuts on to the bolts to learn to associate the nuts and the bolts, providing the child with a collection of threaded screws encouraging the child to thread screws into the second face to learn to insert the screws into a surface, encouraging the child to insert pegs into openings in the first face, providing the child a collection of elastic bands and encouraging the child to stretch elastic bands between the inserted pegs, encouraging the child to manipulate the locks on the third face to open and close the locks, including encouragement to open a hook and eye that close a hinged door and encouragement to open the hinged door and thereby expose a celebratory logo when the child is successful in unhooking the hook and eye and opening the door, encouraging the child to store the pegs in a closeable box having colored internal compartments for separately holding the collections of colored pegs so that the pegs and compartment colors match, and encouraging the child to pack the working platform and closeable box into a carton, whereby a child learns to associate shapes by matching pegs to shaped openings, to associate threaded fasteners by matching threaded shafts to threaded openings and to learn to recognize and operate locks.

* * * * *

UNITED STATES PATENT AND TRADEMARK OFFICE
CERTIFICATE OF CORRECTION

PATENT NO. : 6,142,786
DATED : November 7, 2000
INVENTOR(S) : Culberson et al.

It is certified that error appears in the above-identified patent and that said Letters Patent is hereby corrected as shown below:

U.S. PATENT DOCUMENTS

| | | | |
|---|---|---|---|
| 3,579,862 | 5/1971 | Ballen | 35/8 |
| 3,744,150 | 7/1973 | Folson | 35/8A |
| 3,878,638 | 4/1975 | Benjamin | 46/1L |
| 4,253,197 | 3/1981 | Posta | 2/69 |
| 4,478,583 | 10/1984 | Sellers | 439/259 |
| 4,530,349 | 7/1985 | Metzger | 128/1R |
| 4,934,939 | 6/1990 | Bonneville | 434/247 |
| 5,145,377 | 8/1992 | Tarvin et al. | 434/219 |
| 5,282,749 | 2/1994 | Ketch | 434/395 |
| 5,312,257 | 5/1994 | Tarvin et al. | 434/219 |
| 5,626,477 | 5/1997 | Adkinson | 434/128 |
| 3,775,775 | 12/1973 | Mazzenga | 2/80 |

OTHER PUBLICATIONS

"A Special Picture Cook Book, " undated.

Claim 17, column 8,
Line 5, delete "that" and replace "have" with -- having --.

Claim 26, column 9,
Line 49, after "encouragement" insert -- to --.

Claim 30, column 10,
Line 33, after "screws" insert -- and --.
Line 49, change collection [s] to -- collection --.

Signed and Sealed this

Ninth Day of October, 2001

Attest:

NICHOLAS P. GODICI
Attesting Officer
Acting Director of the United States Patent and Trademark Office